Sept. 8, 1964   J. SCHNEIDER ETAL   3,147,513
DRESSING TOOL FOR POULTRY OR THE LIKE
Filed April 27, 1962   3 Sheets-Sheet 1
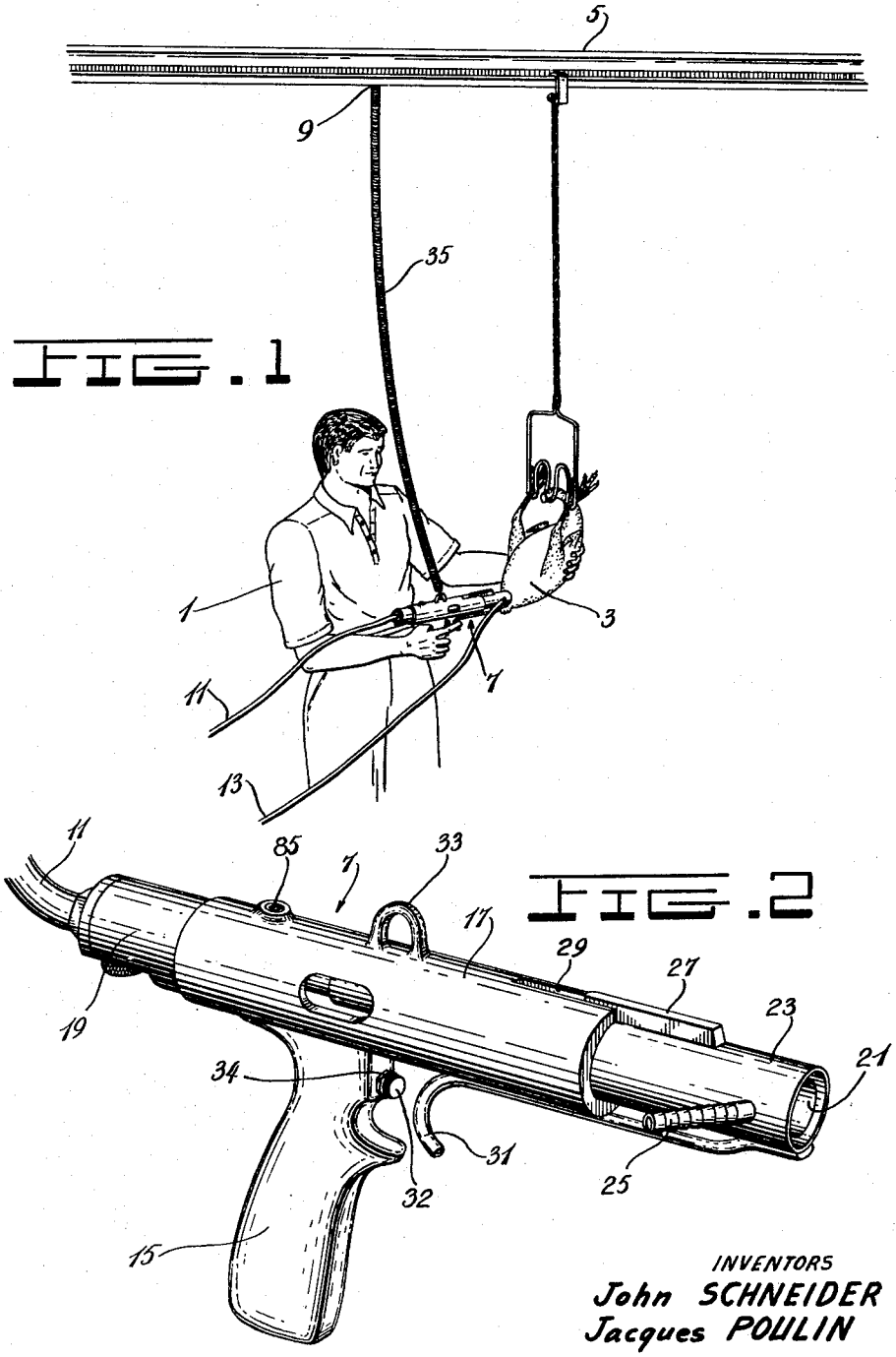
INVENTORS
John SCHNEIDER
Jacques POULIN
BY
ATTORNEYS Sept. 8, 1964   J. SCHNEIDER ETAL   3,147,513
DRESSING TOOL FOR POULTRY OR THE LIKE
Filed April 27, 1962   3 Sheets-Sheet 2
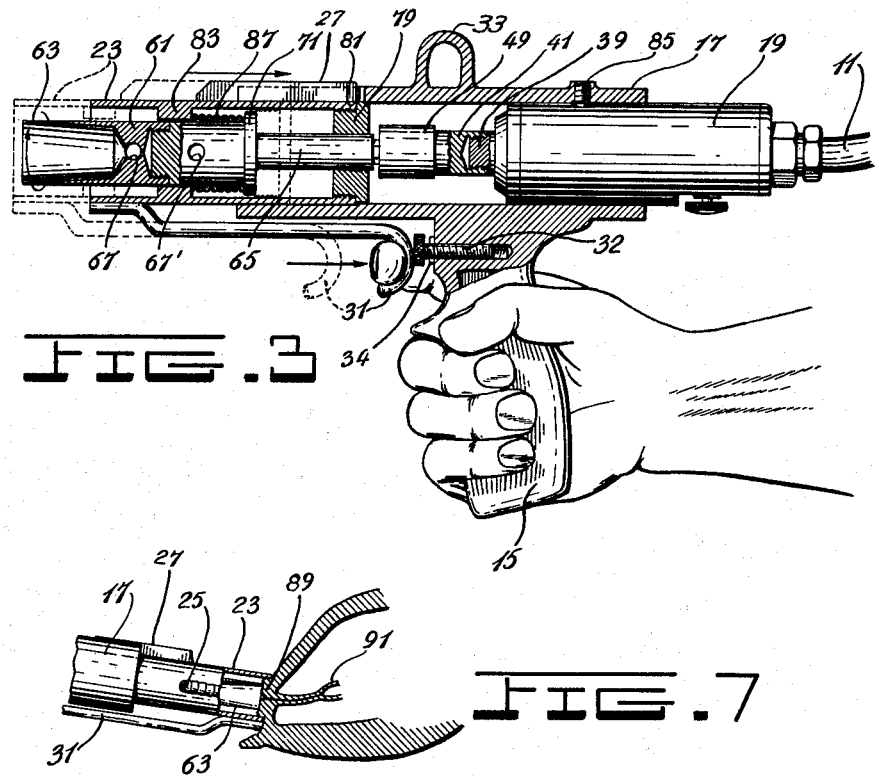
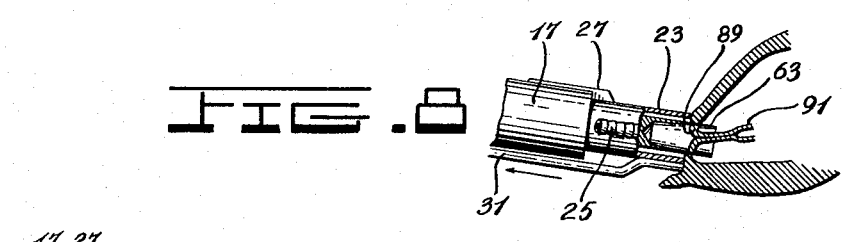
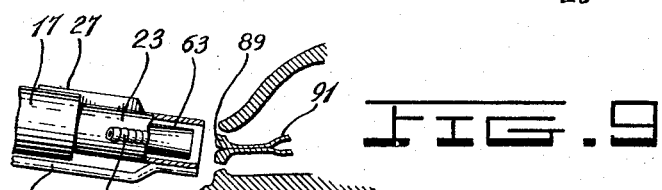
INVENTORS
John SCHNEIDER
Jacques POULIN
BY
ATTORNEYS

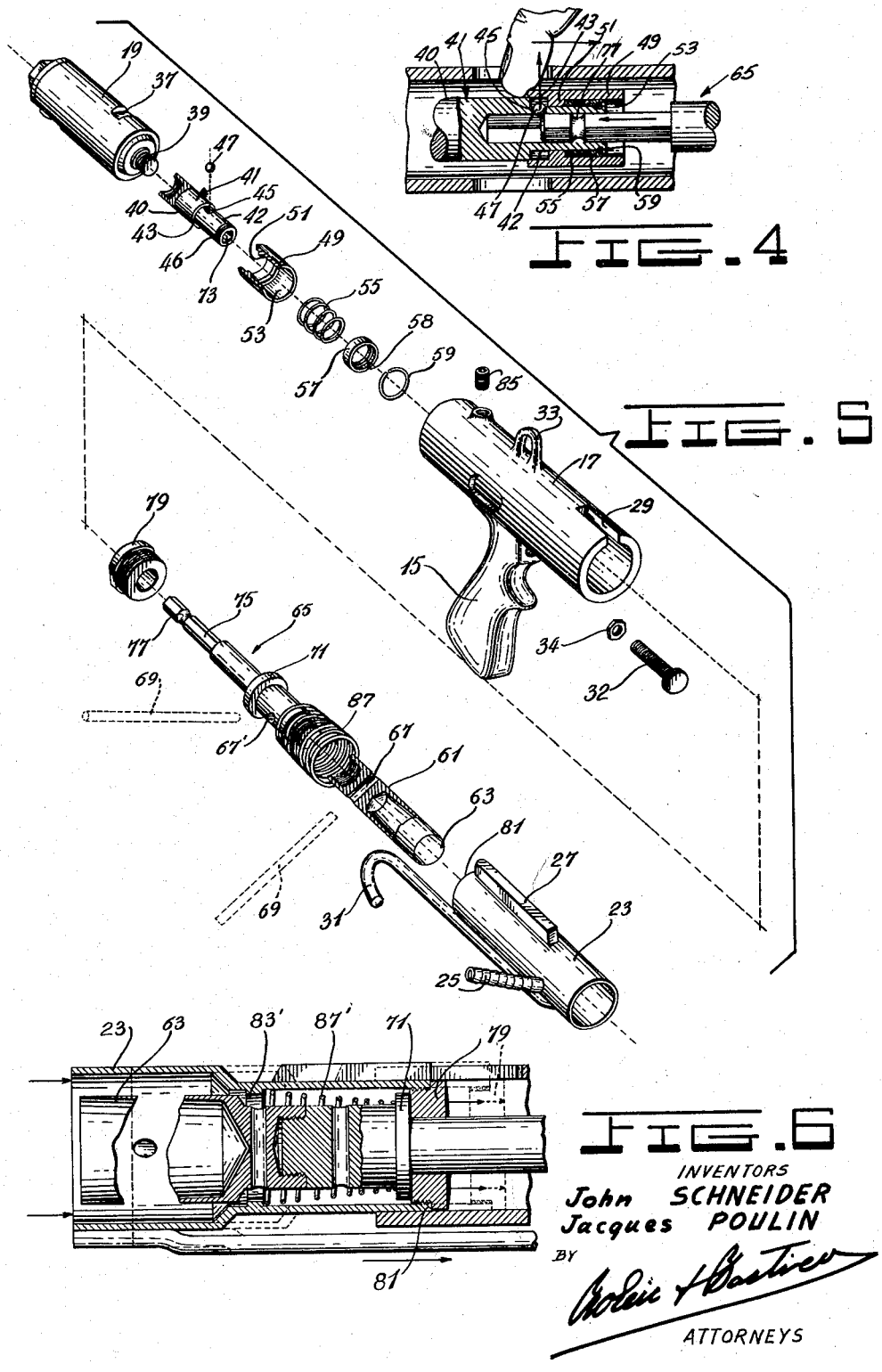

United States Patent Office 3,147,513
Patented Sept. 8, 1964

3,147,513
DRESSING TOOL FOR POULTRY OR THE LIKE
John Schneider, 205 Waverley Road, Toronto 9, Ontario, Canada, and Jacques Poulin, 370 Avenue Royale, Beauport, Quebec, Canada
Filed Apr. 27, 1962, Ser. No. 190,556
7 Claims. (Cl. 17—11)

The instant application pertains to a dressing tool for fowl, poultry or the like animals.

The tool of the invention is intended to be used for the removal of the rectum of a chicken, turkey or any other fowl and may also be used in principle on oxen, hogs, sheep, etc. The apparatus of the invention makes it possible to dress the above animals rapidly and under quite sanitary conditions, contrary to those under which the procedure is being carried out, at present. In removing the rectum of animals such as those mentioned above in processing plants, the work is done by hand and with a knife. The fowl is ordinarily suspended by a hook fixed to a conveyor. A first employee cuts obliquely across the rectum, or the "vent" as it is usually referred to in the trade. Then a second employee cuts or saws the vent from the fowl by means of a knife. This operation causes the contents of the main intestine to spill about the fowl, in many cases. This is quite unsanitary and the fowl must, thereafter, be thoroughly washed and cleaned.

The use of a knife requires that it be kept quite sharp at all times, which means that it has to be shaprened several times a day. Also, in such a manual cutting operation, there is a substantial amount of meat wasted as it is cut with the rectum and thrown away with the intestine.

The first and main object of the invention therefore resides in the provision of a dressing tool for carrying out the above mentioned operation completely automatically and sanitarily.

Another object of the invention lies in the provision of such a dressing tool as above mentioned which makes it possible to carry out the operation very rapidly and without having to sharpen the cutting tool, except vary occasionally.

Yet another object of the invention consists in providing a tool as mentioned above which will not have the inconvenience of cutting through the intestine and will reduce any wastage of meat to a minimum.

Still another object of the invention lies in providing a dressing tool for poultry or the like which is very simple in operation, in construction and which will require a minmum of maintenance.

The above mentioned objects may be attained with a tool according to the invention which comprises a rotatable cutter having a circular blade integral thereto at one end threeof; a non-rotatable sleeve spaced from and concentric to said cutter; said sleeve being movable axially in relation to said cutter from an inoperative position wherein it covers the circular blade to an operative position wherein it uncovers the blade. There is also provided a tubular connection which serves for placing the space located between the sleeve and the cutter under partial vacuum.

In order to better understand the invention, a full description, of a preferred embodiment only, is given below with reference to the accompanying drawings, wherein:

FIGURE 1 illustrates an operator using the dressing tool of the invention on a suspended fowl;

FIGURE 2 is a close-up perspective view of the tool of the invention;

FIGURE 3 is an elevation view of the tool of the invention, shown partly in cross-section in order to illustrate the inner structure;

FIGURE 4 is an enlarged cross-sectional view illustrating the shank-to-motor shaft connection of the apparatus;

FIGURE 5 is an exploded view, with some of the parts being shown in cross-section, of the tool of the invention;

FIGURE 6 is a cross-section view of a modified embodiment;

FIGURES 7, 8 and 9 illustrate various positions of the tool during a dressing operation.

Attention is directed to FIGURE 1 which illustrates an operator 1 about to dress a fowl 3 which hangs from a conveyor 5 by means of a tool 7 made according to the invention, which tool also hangs from the ceiling as at 9 and is fed by a pneumatic line 11 and a vacuum line 13 as will hereinafter be fully explained.

The tool itself, as illustrated in FIGURE 2, is in the form of a pistol having a stock 15 and a generally cylindrical short barrel 17. At one end of this pistol is mounted the pneumatic motor or power means 19 to which is operatively coupled, as will later be described in more details, a cutting circular tool 21 which lies, in inoperative position, within a covering sleeve 23 non-rotatable, spaced from and concentric to the cutter 21. To and through this sleeve 23 is secured a nipple 25 to which the vacuum line 13 is attached. Over sleeve 23 is secured an elongated rectangular key 27 slidably received into the guiding slot 29 on barrel 17. An elongated hooked rod, serving as an operating trigger 31, is secured, as by welding, or otherwise, to the outer end of sleeve 23.

Finally, an eye hook 33 is provided on the barrel 17 to allow the tool to hang as by means of a coil spring 35.

We now turn to FIGURE 5 for a party-by-part description of the tool of the invention. The motor assembly, as illustrated in the upper left of FIGURE 5 is composed of the motor proper 19 over which is cut a transverse groove 37. The motor shaft 39 is adapted to receive, as by threaded engagement or the like, a coupling rod 41 having two sections 40 and 42 of different diameters forming therebetween a radial shoulder 43. The smaller hollow part 42 of rod 41 has a hole 45 extending therethrough for the reception of a locking ball 47 as will later be explained. A small groove 46 is also provided on the outer surface of the smaller section 42 of rod 41.

Over coupling rod 41 is received a tube 49 having an inner radial abutment 51 and a bore 53. Radial abutment 51 is pressed against shoulder 43 of coupling rod 41 by spring 55 located in bore 53 between the radial abutment and a retaining ring 57. The said ring is provided, inwardly thereof, with a chamber 58 for the reception of a locking split ring 59. The assembly of the pieces shown in the upper portion of FIGURE 5 is best illustrated in FIGURE 4. Thus it will be seen that the rearward portion of tube 49 overlies the smaller diameter portion 42 of coupling rod 41, while the forward portion rides over the larger diameter portion. It will be noted that the locking split ring is engageable in the groove 46 at the end of the small diameter portion 42 of coupling rod 41.

The forward assembly of the tool, as illustrated in the lower portion of FIGURE 5, is composed of a cutter member 61 provided, forwardly thereof, with a circular blade 63. Cutter 61 is connected to a shank 65 by being threaded thereto, or by any other suitable means. If threaded, it is suggested that two holes 67, 67' be drilled therethrough for the reception of coupling rods 69. It will be understood that for coupling the two members (61, 65) together rods 69 are inserted into holes 67, 67' and turned in reverse directions.

Shank 65 is provided, intermediately the ends thereof, with a radial flange 71 and has the free end thereof machined into a polygonal or other suitable form for engagement into the corresponding polygonal bore 73 of coupling rod 41. This free end of shank 65 also has a circumferential groove 77. Reference to FIGURE 4 will show that the groove 77 is for the reception of the locking ball 47 for locking the motor shaft onto shank 65. It will also be understood that locking and releasing of shank 65 may be obtained by suitably moving tube 49 against the action of the retaining spring 55 in order to free the locking ball 47 or to set it into groove 77. This type of lock coupling is, of course, well known.

Sleeve 23, previously described, is slid over the coupled cutter and shank and a nut 79 is threaded into the end 81 of sleeve 23. The cutter assembly is shown in position in FIGURE 3 which also illustrates that the inner bore of the sleeve is provided, intermediate the ends thereof, with a circular wall 83.

Motor 19 is slid into barrel 17 and held in position by means of a stud 85 extending through the barrel and received in the groove 37.

A spring 87 is provided between flange 71 of shank 65 and circular wall 83 of sleeve 23 to force the latter outwardly in relation to barrel 17. Trigger 31 thus serves to retract sleeve 23 against the action of spring 87. The retracted position is shown in full line whereas the extracted or inoperative position is shown in dotted lines in FIGURE 3.

In the alternate embodiment of FIGURE 6 the only change has been to increase the diameter of the circular blade 63 of the cutter and for that purpose it has become necessary to increase the diameter of circular wall 83, now identified as 83′, in order to allow free passage of circular blade 63 therethrough. Consequently, spring 87′ is shown as conical in axial cross-section in order to squarely abut both circular wall 83′ and radial flange 71. All other parts remain the same as those shown in FIGURE 3.

In order to control the cutting depth of the cutter 63 or, in other words, the distance of retraction of sleeve 23, an adjusting control screw 32 is provided that threads into stock 15 at the upper end thereof. A nut 34 is used to lock the said control screw into position (FIGURE 3).

Three phases of the operation of the tool are illustrated in FIGURES 7, 8 and 9.

It is first brought near the bird in such a way as to allow circular blade 63 to circumscribe rectum 89 of the bird. In that position, the vacuum created between sleeve 23 and blade 63 will draw in part of the skin around the rectum. Thereafter, trigger 31 is gently pulled back so as to force the rotating cutter inside the bird and around the main intestine 91 as best illustrated in FIGURE 8. At that moment, air around the intestine will cancel the vacuum so that the cutter may easily be pulled back merely by releasing the trigger 31. This is the situation shown in FIGURE 9.

With such a tool, it is thus possible to cut annular holes, around the rectums or vents of the birds, that are of the exact size required to prevent cutting the intestine and prevent spilling of its contents.

Although a specific embodiment has just been described, it will be understood that many modifications may be made thereto without departing from the spirit of the invention, the scope of which is set forth in the appended claims.

We claim:

1. A dressing tool for poultry or the like, comprising: a rotatable cutter; a non-rotatable sleeve movable axially in relation to said cutter, outwardly spaced from and concentric to said cutter; means for placing said space between said cutter and said sleeve under partial vacuum.

2. A dressing tool for poultry or the like, comprising: a rotatable cutter having a circular blade integral thereto at one end thereof; a non-rotatable sleeve outwardly spaced from and concentric to said cutter; said sleeve being movable axially in relation to said cutter from an inoperative position wherein it covers said circular blade to an operative position wherein it uncovers the said blade; means for placing said space between said cutter and sleeve under partial vacuum.

3. A dressing tool for poultry or the like, comprising: a main body; power means within said body; a rotatable cutter, mounted within said body, having a circular blade integral thereto at one end thereof and projecting out of said body; a cylindrical non-rotatable sleeve outwardly spaced from and concentric to said cutter; said sleeve being mounted in said body for axial sliding motion relative to said cutter from an inoperative position wherein it completely covers said blade to an operative position wherein it gradually uncovers the said blade and a vacuum connection through said sleeve for placing the space between said sleeve and said cutter under partial vacuum.

4. A dressing tool as claimed in claim 3, wherein said sleeve is spring pressed to inoperative position.

5. A dressing tool for poultry or the like, comprising: a main body having a cylindrical bore; power means secured within said body; a cylindrical sleeve slidable in said bore; means for non-rotatably displacing said sleeve within said bore; a cutter, having a circular cutting end, mounted within said sleeve in spaced relationship to define therewith a chamber; means connecting the other end of said cutter to said power means for rotation; and a vacuum connection through said sleeve for placing said chamber under partial vacuum when said sleeve and cutter are applied to a bird's rectum whereby said sleeve may be retained against the bird while said cutter is driven into the rectum.

6. A dressing tool for poultry or the like, comprising: a main body having a cylindrical bore and a handle generally normal to the axis of said bore; power means secured within said body; a cylindrical sleeve mounted in said body; means to provide sliding non-rotatable movement to said sleeve between an inoperative position and an operative position with the sleeve projecting out of said body; a cylindrical cutter mounted within said sleeve in spaced relationship to define therewith a chamber; means connecting one end of said cutter to said power means for rotation, with the other end of said cutter lying within said sleeve in inoperative position of the sleeve and outside the sleeve, in operative position thereof; a vacuum connection through said sleeve for placing said chamber under vacuum when said sleeve and cutter are applied to a bird's rectum whereby said sleeve may be retained thereagainst while the cutter is driven into the bird as relative movement takes place between the sleeve and cutter.

7. A tool as claimed in claim 6 wherein said sleeve has an inner radial shoulder acting as a bearing for said cutter and the inner end of said cutter has a peripheral flange; a spring mounted around said cutter and abutting said shoulder and flange to drive said sleeve into inopeartive position.

References Cited in the file of this patent

UNITED STATES PATENTS

| | | |
|---|---|---|
| 2,590,785 | Nealy | Mar. 25, 1952 |
| 2,795,815 | Dahlberg | June 18, 1957 |
| 2,943,346 | Jensen | July 5, 1960 |